Z. STREET.
Improvement in Stock Car.

No. 125,097. Patented March 26, 1872.

WITNESSES.
Jno. L. Ewin
Walter Allen

INVENTOR.
Zadok Street
By Knight Bros.
Attorneys

125,097

UNITED STATES PATENT OFFICE.

ZADOK STREET, OF SALEM, OHIO.

IMPROVEMENT IN STOCK-CARS.

Specification forming part of Letters Patent No. 125,097, dated March 26, 1872.

Specification of an Improvement in Stock-Cars, invented by ZADOK STREET, of Salem, in the county of Columbiana, State of Ohio.

The invention consists in means for securing the adjustable gates to part the animals in the car; in an arrangement for leaving the head-space at the trough side of the car either open or partitioned, as circumstances may demand; in means for adjustably supporting the feed and water troughs.

Figure 3:
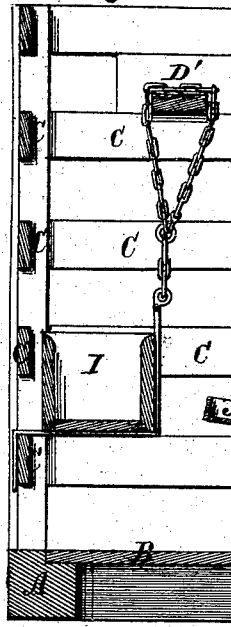
Figure 1:
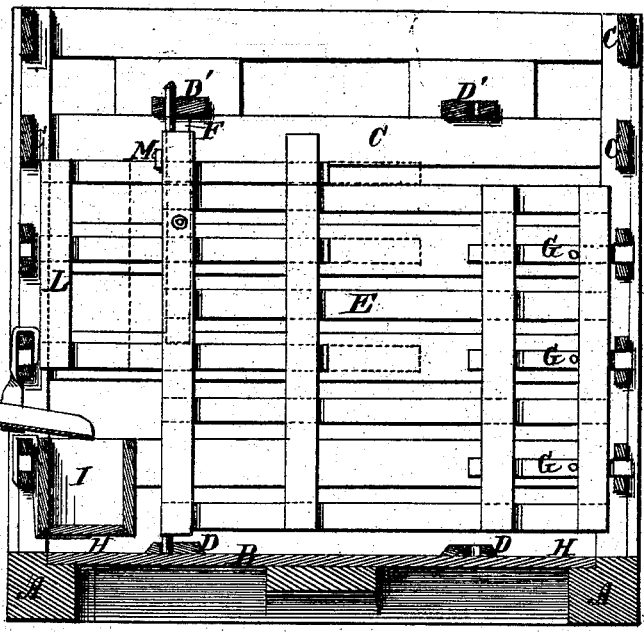
Figure 2:
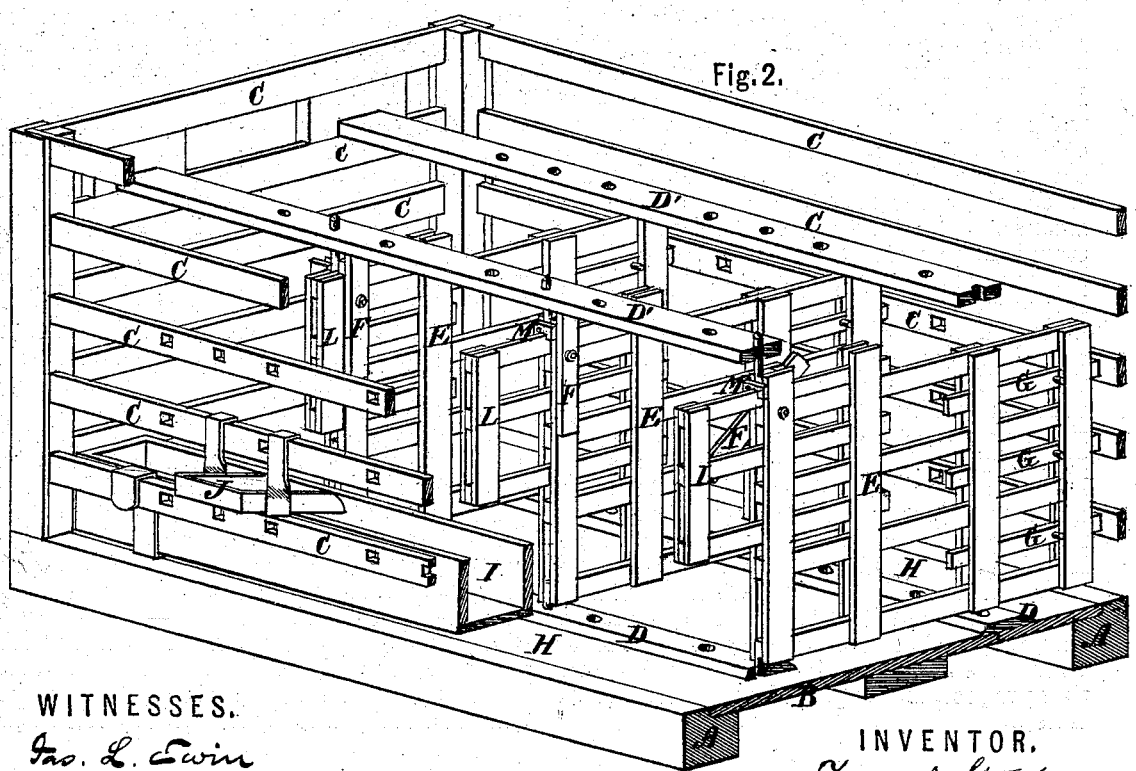

In the drawing, Figure 1 is a transverse vertical section of a car, showing a gate in elevation and the feed trough and spout in section. Fig. 2 is a perspective sectional view of a portion of a car, the roof and part of the side being removed. Fig. 3 is a view of a bar and chain to support the trough instead of hooks.

A B are the timbers and floor of the car, and C the slats of the sides. D D' are longitudinal timbers in the floor and near the ceiling, respectively, and are used for holding the gates E, whose hinging stiles have pivots at their upper and lower ends to enter holes in the bars D D' and swing from thence. These holes are made at distances of about three inches apart, so as to render the gates adjustable for different sizes and conditions of cattle, the widths of whose abdomens may be taken as a general means of determining the amount of width of standing room required for each head.

F is a latch-bar, hung on one side of its mid-length so as to naturally assume and maintain a vertical position. The upper end of this bar comes nearly in contact with the under side of the bar D', and prevents the gate from accidental lifting by the motion of the car, the uprising or restlessness of the animals. When necessary to adjust the gate in another set of holes the latch-bar F is temporarily swung into a horizontal position, the gate lifted, placed in its new position, and then the latch-bar F allowed again to assume its vertical position, in which it may be locked by a button or pin.

The rear end of the gate is fastened, by latch, bolt, pin, hook, or slide, to that side of the car behind the animals. The slide-bars G are for that purpose, and engage in notches in the car slats C.

At the side of the car toward which the heads of the animals are presented is a space, H, about eighteen inches wide, in which is a trough, I, for holding feed or water for the cattle, horses, or mules *in transitu*. J is a spout, which conducts the feed to the trough I. For the use of cattle the trough is placed upon the floor, but for horses or mules it is elevated by hanging it from one of the slats C by means of the hooks on the side of the trough. Instead of the hooks the arrangement shown in Fig. 3 may be used, one end of the bar resting upon a slat, C, and the other supported by a chain from the roof of the car, the trough lying upon the bar and several others similarly arranged.

At the front end of each gate F is a sliding frame, L, which may be slipped forward so as to form a barrier in the space H between the heads of the horses, mules, or short-horned cattle. When carrying long-horned or Texas cattle, the lateral extent of whose horns is greater than the width of the abdomen, it becomes necessary to push back the sliding frames L and leave the said space open. M is a button to lock the slide L in its closed or extended position, falling into one or the other of the notches on the top rail of the said slide L.

A bottom plank, D', is secured near each side of the car, and a corresponding bar, D, is placed above each, so that the gates may be swung from either side, the cattle facing in one or the other direction. The bottom plank D is one and a quarter inch thick and six inches wide, and does not interfere with dead (return) freight. When the stock is discharged the gates are unhung and placed on the top of the car, the trough hung from the bar D' on such side as may be most convenient and out of the way while receiving or delivering freight, leaving the body of the car free for return freight.

By this mode stock of any kinds can be transported any distance without oppression or abuse, regular water or feed stations being provided at suitable intervals—say one hundred and fifty or two hundred miles apart, with men ready at each place with feed and water to be supplied on arrival of stock-trains, the said men being already notified by telegraph of their approach. In thirty minutes a full train of twenty-five cars can be watered and fed by having two men ready with water and feed.

Claims.

I claim as my invention—

1. The combination, with the adjustable pivoted gates E, of the pivoted latch-bar or button F, constructed and operating substantially as described for locking said gates against accidental displacement.

2. The sliding frame L, in combination with the gate E, for the purposes described.

3. The hook-bar and chain, Fig. 3, for supporting the trough at the required height.

ZADOK STREET.

Witnesses:
 JOSEPH BRUFF,
 PETER AMBLER.